United States Patent [19]

Jinnai et al.

[11] 4,293,865
[45] Oct. 6, 1981

[54] INK-JET RECORDING APPARATUS

[75] Inventors: Koichiro Jinnai, Kawasaki; Masanori Horike, Tokyo; Kyuhachiro Iwasaki, Kanagawa; Yutaka Kodama, Fujisawa, all of Japan

[73] Assignee: Ricoh Co., Ltd., Tokyo, Japan

[21] Appl. No.: 78,903

[22] Filed: Sep. 25, 1979

[30] Foreign Application Priority Data

Apr. 10, 1978 [JP] Japan .............................. 53-121430

[51] Int. Cl.³ .......................................... G01D 15/18
[52] U.S. Cl. ................................................ 346/140 R
[58] Field of Search .................................... 346/140 R

[56] References Cited

U.S. PATENT DOCUMENTS 3,666,966  5/1972  Buss ........................... 346/140 R X
3,693,179  9/1972  Skala .......................... 346/140 R X
4,166,277  8/1979  Cielo et al. .................... 346/140 R
4,189,734  2/1980  Kyser et al. ................. 346/140 R X Primary Examiner—George H. Miller, Jr.
Attorney, Agent, or Firm—Burgess, Ryan & Wayne

[57] ABSTRACT

A voltage is applied to a plurality of electromechanical transducers mounted on a plurality of nozzles, respectively, so that a meniscus may be formed at the nozzle tip. One or more opposing electrodes or rear transducers are disposed in opposed relationship with a predetermined number of nozzles, respectively, the number of the opposing electrodes or rear transducers being less than that of the nozzles. When one of the opposing electrodes or rear transducers which is in opposed relationship with the nozzle whose transducer is applied with a voltage is applied with a voltage, an ink drop is issued. The opposing electrodes are applied with a voltage in a time-division manner.

7 Claims, 14 Drawing Figures

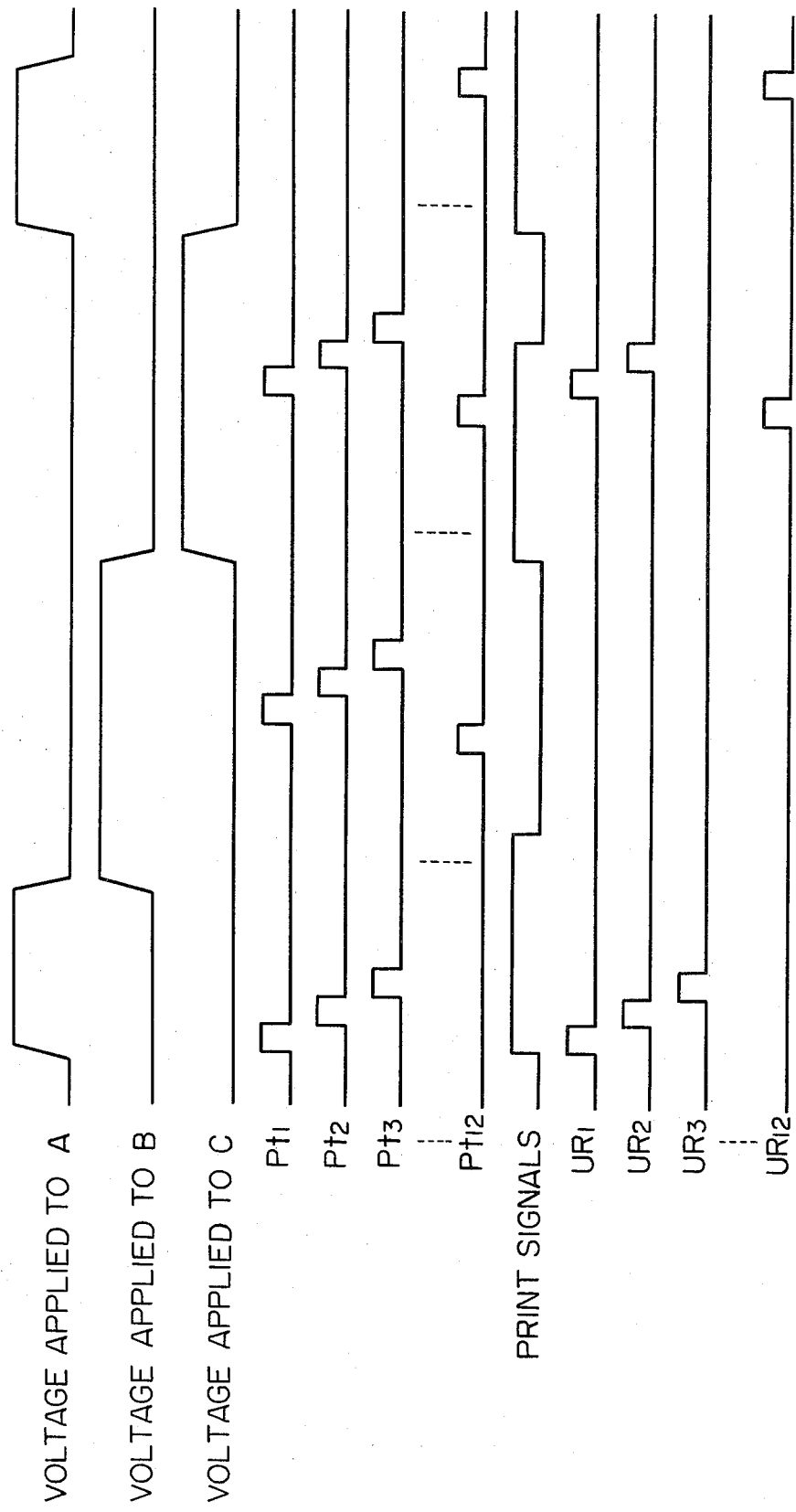

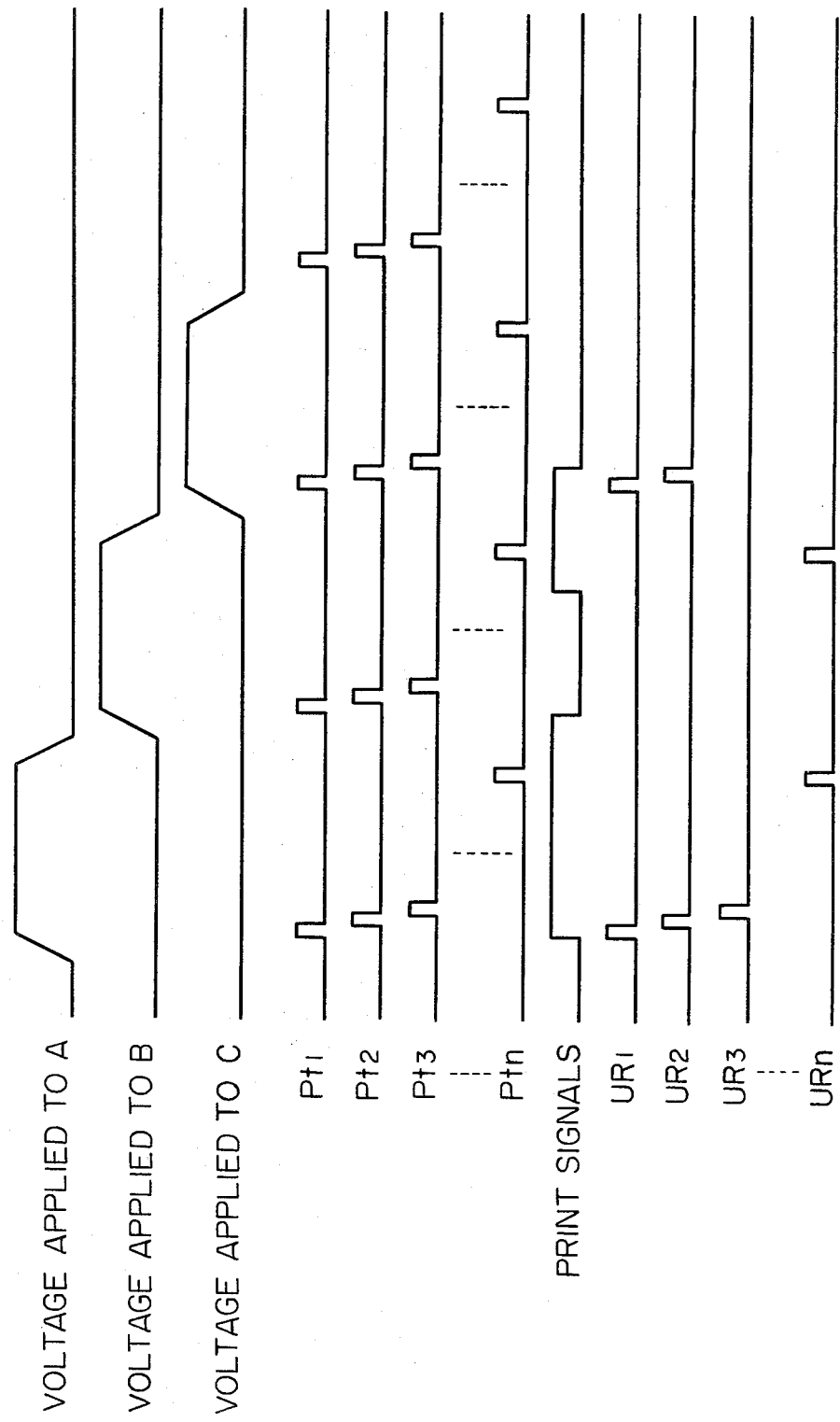

INK-JET RECORDING APPARATUS

BACKGROUND OF THE INVENTION

The present invention relates to an ink-jet recording apparatus which may accomplish the time-division driving.

In the prior art ink-jet recording apparatus, each nozzle is provided with one electromechanical transducer to which is applied a voltage in response to a print signal so that the printing may be made. In the apparatus of the type described above, the individual transducers are controlled in response to the print signals so that each transducer must be provided with a driving circuit. As a result, when the nozzles are arrayed at a pitch of 12 dots per millimeter, about 3600 transducers are needed in case of A4 and consequently 3600 driving circuits are also needed. As a consequence, the recording apparatus becomes very expensive and large in size because there must be provided spaces for connecting lead wires to the driving circuits.

SUMMARY OF THE INVENTION

Accordingly, the primary object of the present invention is to provide an ink-jet recording apparatus which may accomplish the time-division driving, may reduce both the driving circuits and lead wires, may be fabricated at low costs and may be made compact in size.

BRIEF DESCRIPTION OF THE DRAWINGS

FIG. 6 shows the waveforms of the signal present in the circuit shown in FIG. 5;

FIG. 13 shows the waveforms of the signals present in the circuit shown in FIG. 12.

DESCRIPTION OF THE PREFERRED EMBODIMENTS

Figure 1:
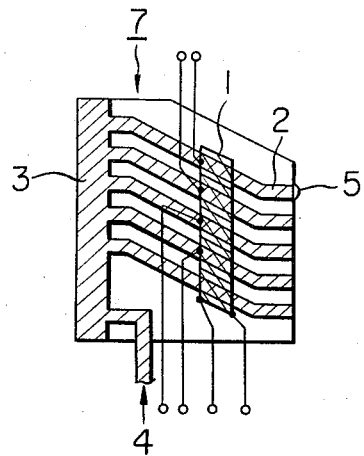
FIG. 1 is a diagram showing the construction of a print head in accordance with the present invention.
Figure 2:
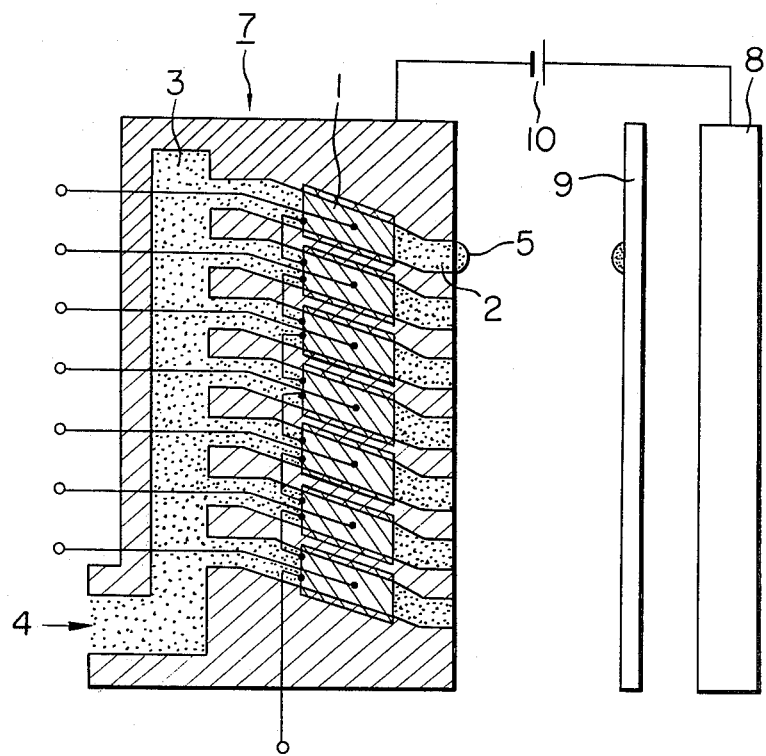
FIG. 2 is a diagram showing the relationships in position between the print head shown in FIG. 1, an opposing electrode and a recording paper.
Figures 3, 5:
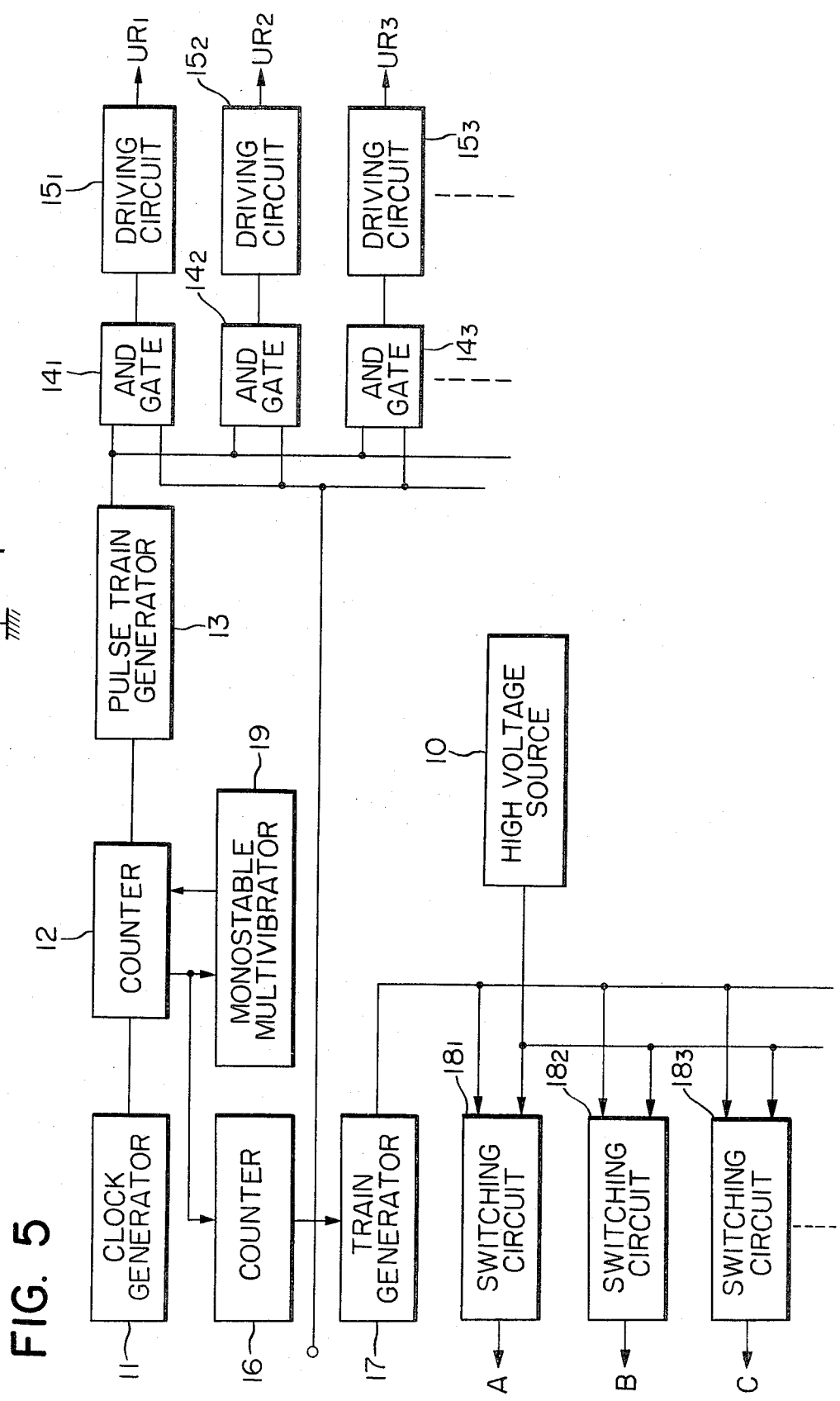
FIG. 3 is a diagram showing the whole construction when the print head shown in FIG. 1 is used in a recording apparatus.
FIG. 5 is a block diagram of a circuit for generating the driving signals.

In FIG. 1 is shown the construction of a print head used in the present invention. 1 is an electromechanical transducer; 2, a nozzle; 3, an ink manifold; 4, an ink supply; and 5, a meniscus. FIGS. 2 and 3 show the whole construction of a recording appratus in which the print head of the type shown in FIG. 1 is used in practice. Those parts similar to or identical with those shown in FIG. 1 are designated by similar reference numerals. 6 is a control unit; 7, a print head; 8, an opposing electrode; 9, a recording paper; and 10, a high voltage source. In FIGS. 2 and 3, the transducer 1 is applied with such a voltage that a meniscus 5 may be formed by the balance between the pressure generated by the transducer 1 and the surface tension of ink. When a high voltage is applied between the ink and the opposing electrode 8 under the above conditions, the electrostatic force overcomes the surface tension of ink so that the ink is torn off from the nozzle 2 and flies toward the opposing electrode 8, thereby forming a liquid drop. In this case, when the recording paper 9 is placed between the print head 7 and the opposing electrode 8, the printing is effected. In order to use this as a print head, a predetermined high voltage is applied to the opposing electrode 8, and the voltage to be applied to each transducer 1 is turned on and off in response to the print signals. With this arrangement, a low switching voltage may be used so that the printing speed may be improved. Furthermore, the pressure produced by the transducer may suffice only to form a meniscus 5 so that the transducers small in size may be used and the integration may be facilitated. In the case of FIG. 1, no ink drop will be formed even when a strong electric field operates unless a meniscus 5 is formed by the pressure generated by the transducer 1. Conversely, unless a strong electric field is established, no ink drop may be formed even when the transducer 1 is energized.

Figure 4:
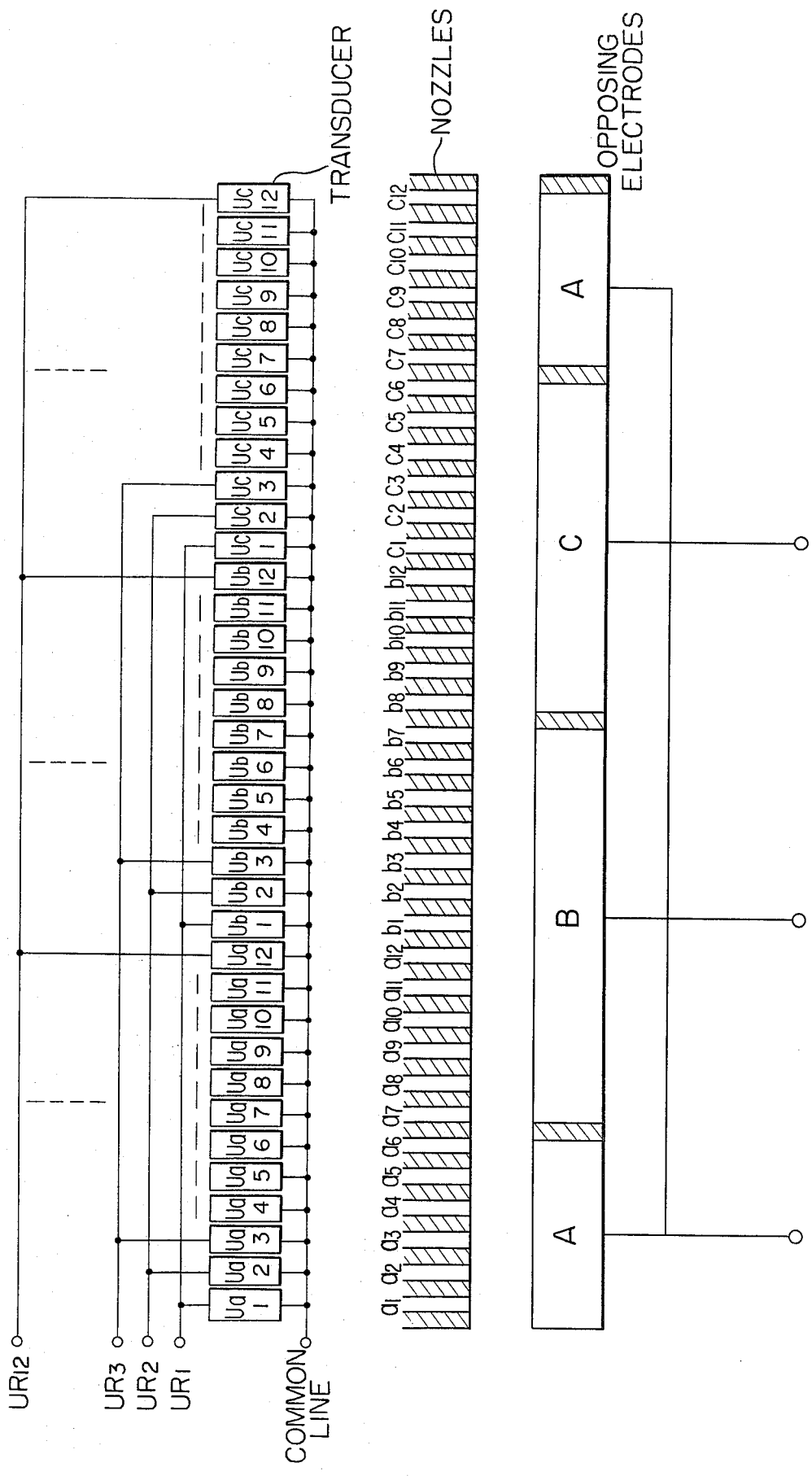
FIG. 4 shows the connections among opposing electrodes and transducers.

The present invention is based on the above two observed facts and contemplates to drive the print head in a time-division manner. In FIG. 4 is shown the connections of the opposing electrodes and transducers which may attain the above object. For the sake of explanation, it is assumed that the number of nozzles is 12 and the number of opposing electrodes is 3, but it is to be understood that the present invention is not limited to this arrangement. In FIG. 4, the length of the opposing electrodes corresponds to the array of 12 nozzles, and the opposing electrodes are designated by A, B and C. The nozzles in opposed relationship with the opposing electrodes A, B and C are designated by $a_1$ through $a_{12}$; $b_1$ through $b_{12}$ and $c_1$ through $c_{12}$. The transducer for the nozzle $a_1$ is designated by $Ua_1$; the transducer for the nozzle $b_1$, by $Ub_1$; and so on. The transducers are connected as shown below:

$$Ua_1 - Ub_1 - Uc_1 \longleftarrow UR_1$$

$$Ua_2 - Ub_2 - Uc_2 \longleftarrow UR_2$$

$$\vdots \qquad \vdots \qquad \vdots \qquad \vdots$$

$$Ua_{12} - Ub_{12} - Uc_{12} \longleftarrow UR_{12}$$

When a voltage is applied to the opposing electrode A and a pulse is applied to $UR_1$, an ink drop issues from the nozzle $a_1$, but no ink drop will issue from the nozzle $b_1$ or $c_1$ because no voltage is applied to the opposing electrodes B and C. As the pulses are applied to $UR_2$ through $UR_6$, the printing is effected by the nozzles $a_1$ through $a_6$. In like manner, the printing by the nozzles $a_7$ through $a_{12}$ and by the nozzles $b_1$ through $b_6$ is carried out. Next the voltage is applied to the opposing electrode C, the printing by the nozzles $b_7$ through $b_{12}$ and $c_1$ through $c_6$ is carried out. When the voltage is applied to the opposing electrode A, the printing by the nozzles $c_7$ through $c_{12}$ is carried out. Thus the whole line is printed. These relationships will be described in detail with further reference to FIGS. 5 and 6. FIG. 5 shows the construction for generating the signals for driving the transducers and opposing electrodes. FIG. 6 shows the waveforms of the signals present in the circuit shown in FIG. 5. Clock signals of a predetermined frequency which are generated by a clock generator 11 are counted by a modulo-12 counter 12, and the contents in the counter 12 is transmitted to a pulse train generator 13 which in turn generates the pulse trains $Pt_1$ through $Pt_{12}$ as shown in FIG. 6. The AND of the pulse train Pt and the print signals is obtained by each of AND gates $14_1$ through $14_{12}$ and is applied through a driving circuit 15 to UR. The zero count by the counter 12 is transmitted to a modulo-3 counter 16 and the contents in the counter 16 is applied to a pulse train generator 17 which in turn generates pulse trains. In response to the pulse trains from the generator 17, a high voltage is switched by switching circuits $18_1$, $18_2$ and so on so that the high voltage may be applied to the opposing electrodes A, B and C time serially. Because of the rising and falling of the switched high voltage, a monostable multivibrator 19 is provided to interrupt the impression of the voltage to the transducers. It is assumed that the number of 3600 nozzles are arrayed into a 36×100 matrix. Then, 100 driving circuits and 36 switching circuits suffice. This means a considerable reduction in size of the control unit with the resultant reduction in cost and in number of lead wires. Furthermore the adverse effects of the opposite electrode A on the nozzle $a_7$, the adverse effects of the electrode B on the nozzle $a_6$ and the adverse effects on the nozzles at the end faces of the electrodes may be substantially eliminated.

The effects and functions of the print head driving system of the type described remain unchanged even when rear electrodes are disposed backwardly of the transducers.

Figure 7:
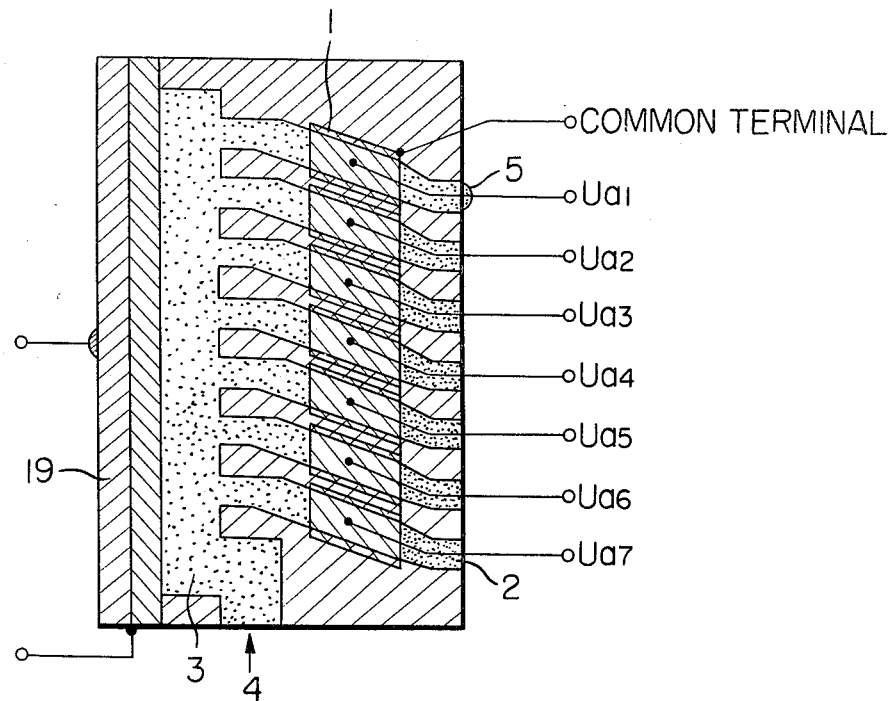
FIG. 7 shows another embodiment of an ink-jet print head in accordance with the present invention.

In FIG. 7, 1 designates seven transducers $Ua_1$ through $Ua_7$; 2, a nozzle; 3, an ink manifold; 4, an ink supply; 5, a meniscus; and 19, a rear transducer which is applied with a driving voltage so that the transducer 19 alone may build up a pressure sufficient to form a meniscus at each nozzle 2. In like manner, a voltage applied to the transducers $Ua_1$ through $Ua_7$ is so selected that each of them may cause a meniscus 5 to be formed at the tip of the corresponding nozzle 2 independently of the driving voltage applied to the rear transducer 19. When the rear transducer 19 is driven, the pressure is transmitted from the ink manifold 3 towards the nozzles 2. When the transducers $Ua_1$ through $Ua_7$ are driven, the pressures are produced which propagate not only towards the ink manifold 3 but also toward the nozzle tips. The pressures transmitted backwardly; that is, towards the ink manifold 3 are cancelled by the pressure produced by driving the rear transducer 19 so that the flow of the ink from the ink manifold 3 to the ink supply inlet 4 may be avoided. The pressure propagated towards the nozzle tip is superposed on the pressure transmitted from the rear transducer 19. That is, the pressure transmitted towards the nozzle tip is doubled in strength so that an ink drop is formed. When the voltages applied to the transducers are removed, the ink flows through the inlet 4 into the ink manifold 3. With this construction, each transducer suffices only to generate the pressure sufficient enough to form a meniscus 5 at the nozzle tip so that the transducers may be reduced in size and the integration may be much facilitated.

Figure 8:
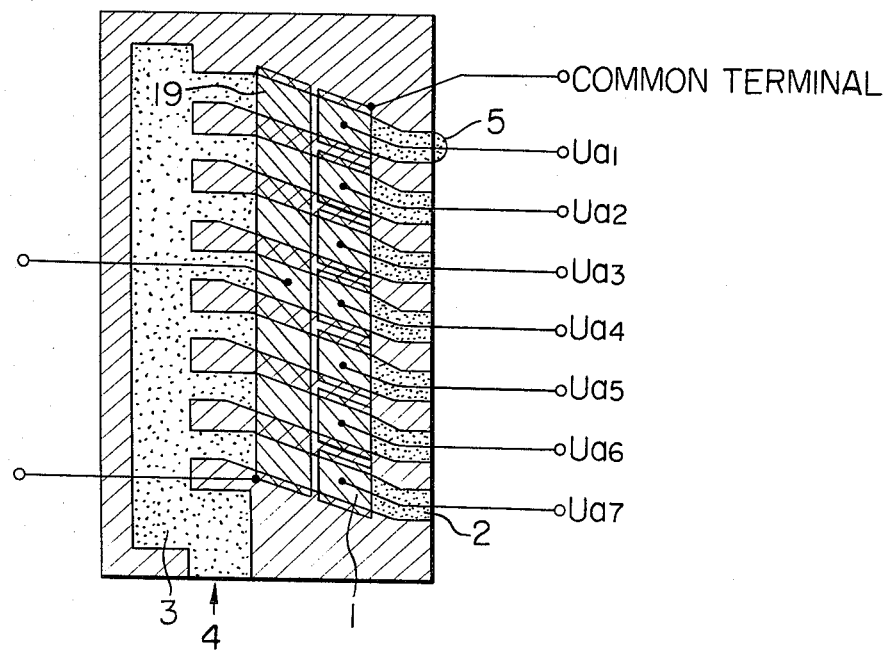
FIG. 8 shows a further embodiment of an ink-jet print head in accordance with the present invention.

Another embodiment of the present invention is shown in FIG. 8 in which parts similar to those shown in FIG. 7 are designated by similar reference numerals. The mechanism for forming an ink drop is similar to that shown in FIG. 1, but the embodiment shown in FIG. 8 may attain the uniform pressure distribution towards the nozzle tip.

Figure 9:
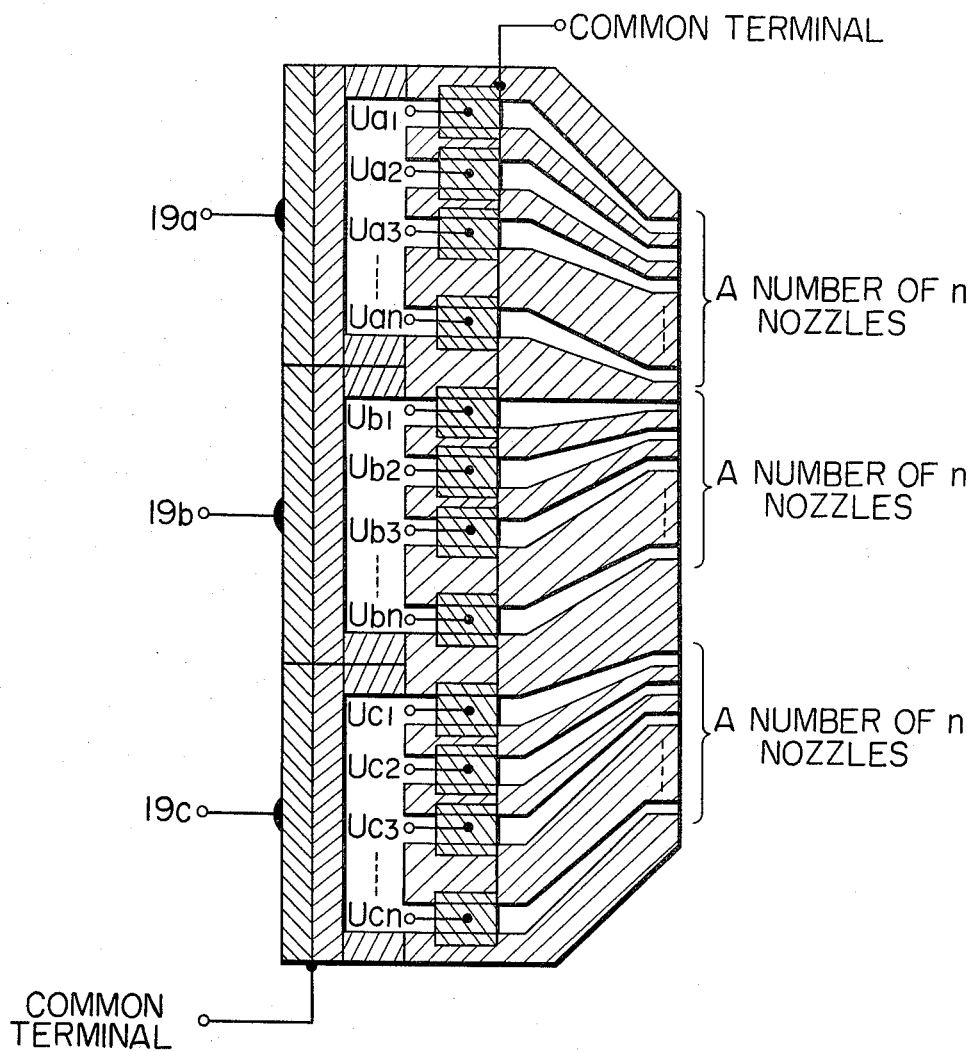
FIG. 9 shows an embodiment wherein a plurality of print heads of the type shown in FIG. 1 are arrayed.
Figure 10:
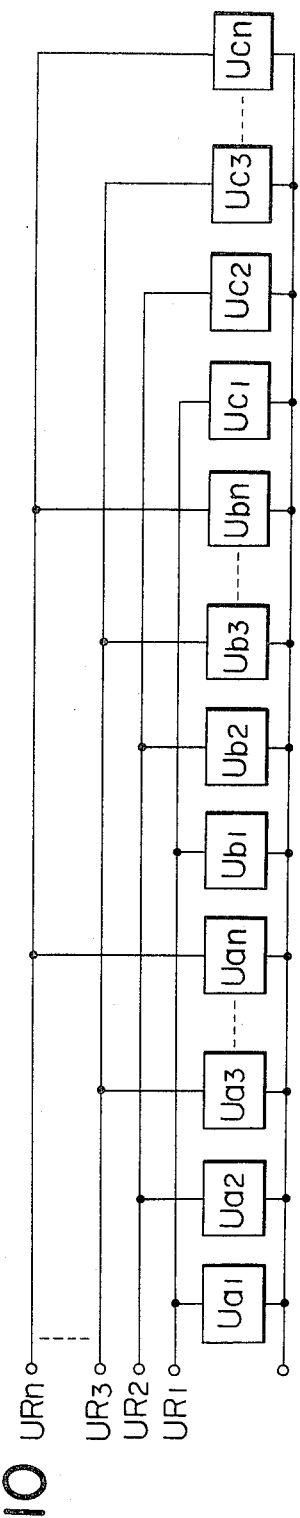
FIG. 10 shows the connections of transducers.

In FIG. 9 is shown an assembly consisting of a plurality of print heads of the type shown in FIG. 7. Rear transducers 19a, 19b, 19c and so on are provided for respective arrays of n nozzles which have individual transducers $Ua_1$ through $Ua_n$; $Ub_1$ through $Ub_n$; $Uc_1$ through $Uc_n$; and so on. Even when the common transducers 19a, 19b and 19c are driven, no ink drop will be formed unless the individual transducers $Ua_1$ through $Uc_n$ are energized. Conversely even when the individual transducers $Ua_1$ through $Uc_n$ are driven, no ink drop will be formed unless the common transducers 19a, 19b and 19c are energized. The driving system in accordance with the present invention is based upon the above-described two facts and has for its object to attain the time-division driving of the transducers. In FIG. 10 is shown the electrical connection of the transducers for respective nozzles.

$$UR_1 \longrightarrow Ua_1 - Ub_1 - Uc_1 \ldots$$

$$UR_2 \longrightarrow Ua_2 - Ub_2 - Uc_2 \ldots$$

$$\vdots$$

$$UR_n \longrightarrow Ua_n - Ub_n - Uc_n \ldots$$

When the transducers 19a is driven and the pulse is applied to $UR_1$, the transducers $Ua_1$, $Ub_1$ and $Uc_1$ are driven so that the ink issues from the nozzles $a_1$, but since the common transducers 19b and 19c are not driven, no ink will issue from the nozzles $b_1$ and $c_1$. Repeating the step a number of n times, the ink issues from the nozzles $a_1$ through $a_n$. Next the common transducer A is de-energized while the common transducer B is energized and $UR_1$ through $UR_n$ are driven so that the ink issues from the nozzles $b_1$ through $b_n$. In like manner, the transducers 19c and 19d are driven so that the ink issues from the nozzles.

Figure 12:
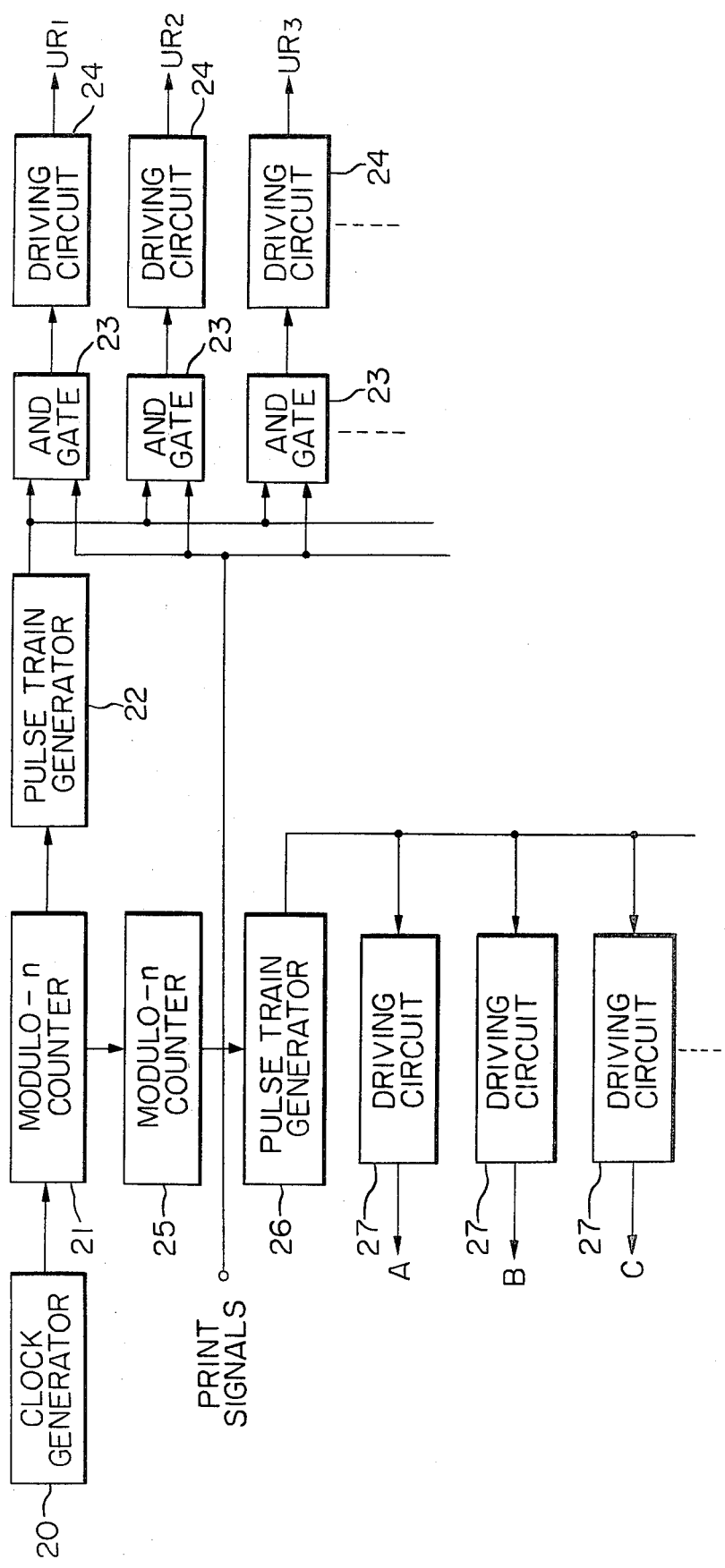
FIG. 12 shows in block diagram a circuit for generating the driving signals.
Figure 11:
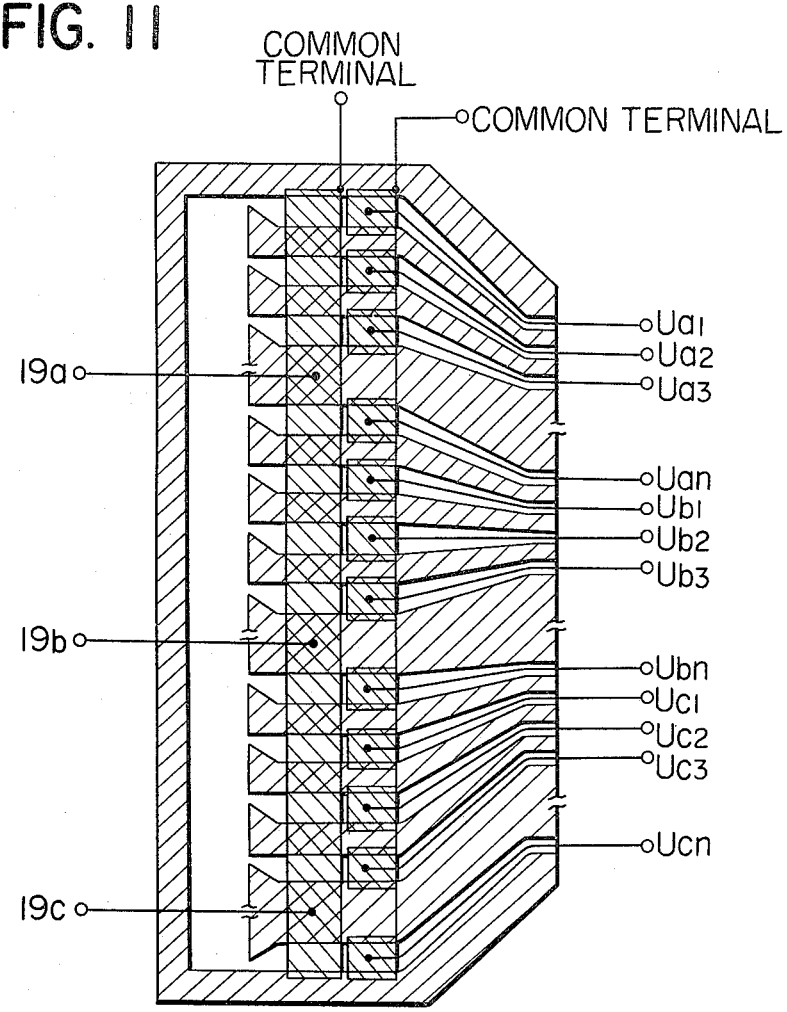
FIG. 11 shows an embodiment wherein a plurality of print heads of the type shown in FIG. 8 are arrayed.

In FIG. 11 is shown an assembly consisting of a plurality of print heads of the type shown in FIG. 8. As with the print head shown in FIG. 9, the time-division driving is possible. The time-division driving will be described in detail with reference to FIGS. 12 and 13. FIG. 12 is a block diagram of a circuit for deriving the signals for driving the common and individual transducers and FIG. 13 shows the waveforms of the signals present in the circuit shown in FIG. 12.

The clock signals at a predetermined frequency generated by a clock generator 20 are counted by a modulo-n counter 21, and the contents in the counter 21 is transmitted to a pulse train generator 22 which in turn generates pulse trains $Pt_1$ through $Pt_n$ as shown in FIG. 13. The AND of the pulse train and the print signal derived from an AND gate 23 is amplified by a driving circuit 24 and applied to $UR_1$ through $UR_n$.

The zero count of the counter 21 is transmitted to a modulo-m counter 25, and a pulse train generator 26 generates pulse trains for energizing the common transducers 19a, 19b, 19c and so on. These pulse trains are amplified by driving circuits 27 and are applied time-serially to the common transducers 19a, 19b, 19c and so on. The ink issues from the nozzle which is driven by both the common and individual transducers.

When 3600 nozzles are arrayed with m=60 and n=60, 120 driving circuits may suffice to drive the transducers so that the driving system may be considerably simplified and the number of lead wires may be drastically reduced.

Figure 14:
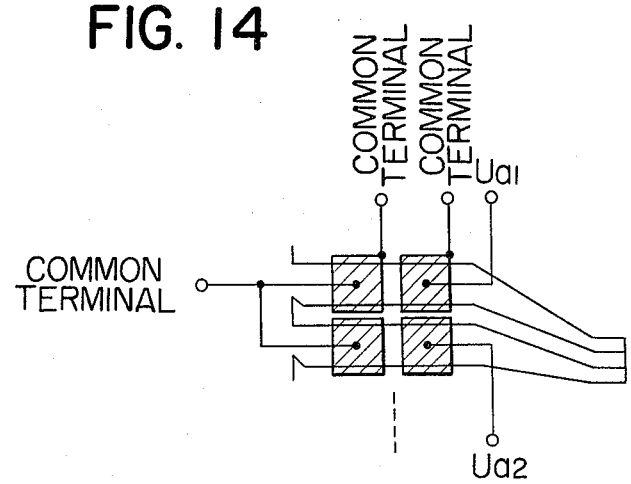
FIG. 14 shows a still further embodiment of the present invention.

A still another embodiment of the present invention is shown in FIG. 14. Each nozzle is provided with two transducers. One transducers are connected in common into groups 19a, 19b and 19c as shown so that the time-division driving may be carried out.

What is claimed is:

1. A multiple nozzle ink jet printing apparatus, comprising:
   a plurality of ink jet nozzles;
   a corresponding plurality of electromechanical transducers, each transducer being coupled to a corresponding nozzle to selectively apply sufficient pressure to ink therein to cause the ink to form a convex meniscus extending out of the corresponding nozzle, said ink being contained within said nozzle in the absence of a print signal applied to the corresponding transducer; and
   supplemental ink ejection means for applying sufficient force to said meniscus to cause said meniscus to form an ink drop, and to propel said ink drop toward a recording surface, said supplemental ink ejection means affecting only the ink associated with a nozzle or nozzles having a convex meniscus extending therefrom.

2. The apparatus according to claim 1, wherein said supplemental ink ejection means comprises an electrode adjacent said recording surface, and means for applying an ink-attracting potential to said electrode.

3. The apparatus according to claim 2, wherein said electrode is divided into a plurality of segments, each segment being disposed in opposed relationship with a group of said nozzles.

4. The apparatus according to claim 3, further comprising means for sequentially applying said ink-attracting potential to each of said electrode segments, and for sequentially scanning each group of nozzles during the time said potential is applied to the corresponding elecrode segment.

5. The apparatus according to claim 1, wherein said supplemental ink ejection means comprises a common rear electromechanical transducer for applying pressure to an ink reservoir communicating with all of said nozzles.

6. The apparatus according to claim 5, wherein said common rear electromechanical transducer is divided into a plurality of segments, each segment being disposed in opposed relationship with a group of said nozzles.

7. The apparatus according to claim 6, further comprising means for sequentially applying a bias signal to each of said common rear electromechanical transducer segments, and for sequentially scanning each group of nozzles during the time said bias signal is applied to the corresponding transducer segment.

* * * * *

UNITED STATES PATENT AND TRADEMARK OFFICE
CERTIFICATE OF CORRECTION

PATENT NO. : 4,293,865

DATED : October 6, 1981

INVENTOR(S) : Koichiro Jinnai

It is certified that error appears in the above—identified patent and that said Letters Patent is hereby corrected as shown below:

Column 1, line 67: "appratus" should be --apparatus--.

Column 5, line 16: "One" should be --The--.

Signed and Sealed this

Fifteenth Day of March 1983

[SEAL]

Attest:

GERALD J. MOSSINGHOFF

Attesting Officer

Commissioner of Patents and Trademarks